(12) United States Patent
Page et al.

(10) Patent No.: US 6,499,455 B1
(45) Date of Patent: Dec. 31, 2002

(54) SYSTEM AND METHOD FOR PREVENTING EXHAUST GASES FROM ENTERING AN INTAKE MANIFOLD OF AN ENGINE

(75) Inventors: Frederick Allan Page, Canton; Thomas Francis Mausolf, Livonia, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/682,499

(22) Filed: Sep. 10, 2001

(51) Int. Cl.[7] ............................................. F02B 77/00
(52) U.S. Cl. ............................ 123/198 R; 123/198 DC
(58) Field of Search ...................... 123/198 R, 198 DC

(56) References Cited

U.S. PATENT DOCUMENTS

| | | |
|---|---|---|
| 3,760,785 A | 9/1973 | Harrison et al. |
| 3,841,282 A * | 10/1974 | Rogerson .................. 123/97 B |
| 3,895,615 A | 7/1975 | Schubeck |
| 3,960,130 A | 6/1976 | Peterson, Jr. |
| 4,043,310 A | 8/1977 | Ichimiya et al. |
| 4,177,784 A | 12/1979 | Tatsutomi et al. |
| 4,213,437 A | 7/1980 | Onofrio |

* cited by examiner

*Primary Examiner*—Tony M. Argenbright
*Assistant Examiner*—Katrina B. Harris
(74) *Attorney, Agent, or Firm*—John F. Buckert; Allan J. Lippa

(57) ABSTRACT

A control system 14 and method for preventing exhaust gases from entering an intake manifold 26 of an engine 21 after engine shutdown is provided. The engine 12 includes a valve controlling air flow into the intake manifold 26. The method includes determining when the engine 12 has been shutdown. The method further includes opening the valve for a predetermined amount of time after the engine shutdown to allow air at ambient atmospheric pressure to communicate with the intake manifold 26. Thus, a relatively high air pressure in an intake manifold 26 prevents exhaust gases from migrating into the intake manifold 26 which reduces a subsequent engine crank period.

7 Claims, 2 Drawing Sheets

SYSTEM AND METHOD FOR PREVENTING EXHAUST GASES FROM ENTERING AN INTAKE MANIFOLD OF AN ENGINE

BACKGROUND OF INVENTION

The invention relates to a control system and method for preventing exhaust gases from entering an intake manifold of an engine after engine shutdown.

Engines have long used throttle valves and idle air control valves to adjust the amount of airflow into engine intake manifolds. Generally, a powertrain controller generates first and second control signals to control operational positions of the throttle valve and the idle air control valve, respectively.

When an engine is shutdown, the throttle valve and idle air control valve are generally closed. As a result, the air pressure in the intake manifold has a relatively low pressure (i.e., a vacuum) compared to the pressure of exhaust gases in an exhaust manifold. Further, after engine shutdown, intake and exhaust valves communicating with an engine cylinder may overlap in an open position. As a result, the exhaust gas in the exhaust manifold may migrate through the engine cylinder and into the intake manifold. Thereafter, during engine crank, the exhaust gases in the intake manifold must be pumped through the engine cylinders before sufficient oxygen is supplied to the cylinders for combustion to occur. Thus, the migration of exhaust gases into the intake manifold, after engine shutdown, results in a long engine crank (i.e., startup time) that is undesirable to vehicle operators.

SUMMARY OF INVENTION

The above-identified disadvantages of conventional control systems and methods are substantially overcome by a control system and method described and claimed herein.

A method for preventing exhaust gases from entering the intake manifold after engine shutdown in accordance with the present invention is provided. The engine includes a valve controlling airflow into the intake manifold. The method includes determining when the engine has been shutdown. The method further includes opening a valve for a predetermined amount of time after engine shutdown to allow air at an ambient atmospheric pressure to communicate with the intake manifold.

A control system for preventing exhaust gases from entering an intake manifold after engine shutdown in accordance with the present invention is provided. The control system includes a valve actuator configured to control an operational position of a valve controlling air flow into the intake manifold, responsive to a control signal. The control system further includes a control circuit that is operably connected to the valve actuator. The control circuit is configured to determine when the engine has been shutdown. The control circuit is further configured to generate a control signal to induce the valve actuator to open the valve for a predetermined amount of time after engine shutdown to allow air at ambient atmospheric pressure to communicate with the intake manifold.

The control system and method for preventing exhaust gas from entering an intake manifold of an engine after engine shutdown provides a substantial advantage over conventional systems and methods. In particular, the control system increases the air pressure in the intake manifold to ambient atmospheric pressure after engine shutdown. As a result, exhaust gases remain substantially within the exhaust manifold after engine shutdown. Thereafter, the engine may be started quickly because fresh air is immediately inducted into the engine cylinders during engine crank.

DETAILED DESCRIPTION

Figure 1:
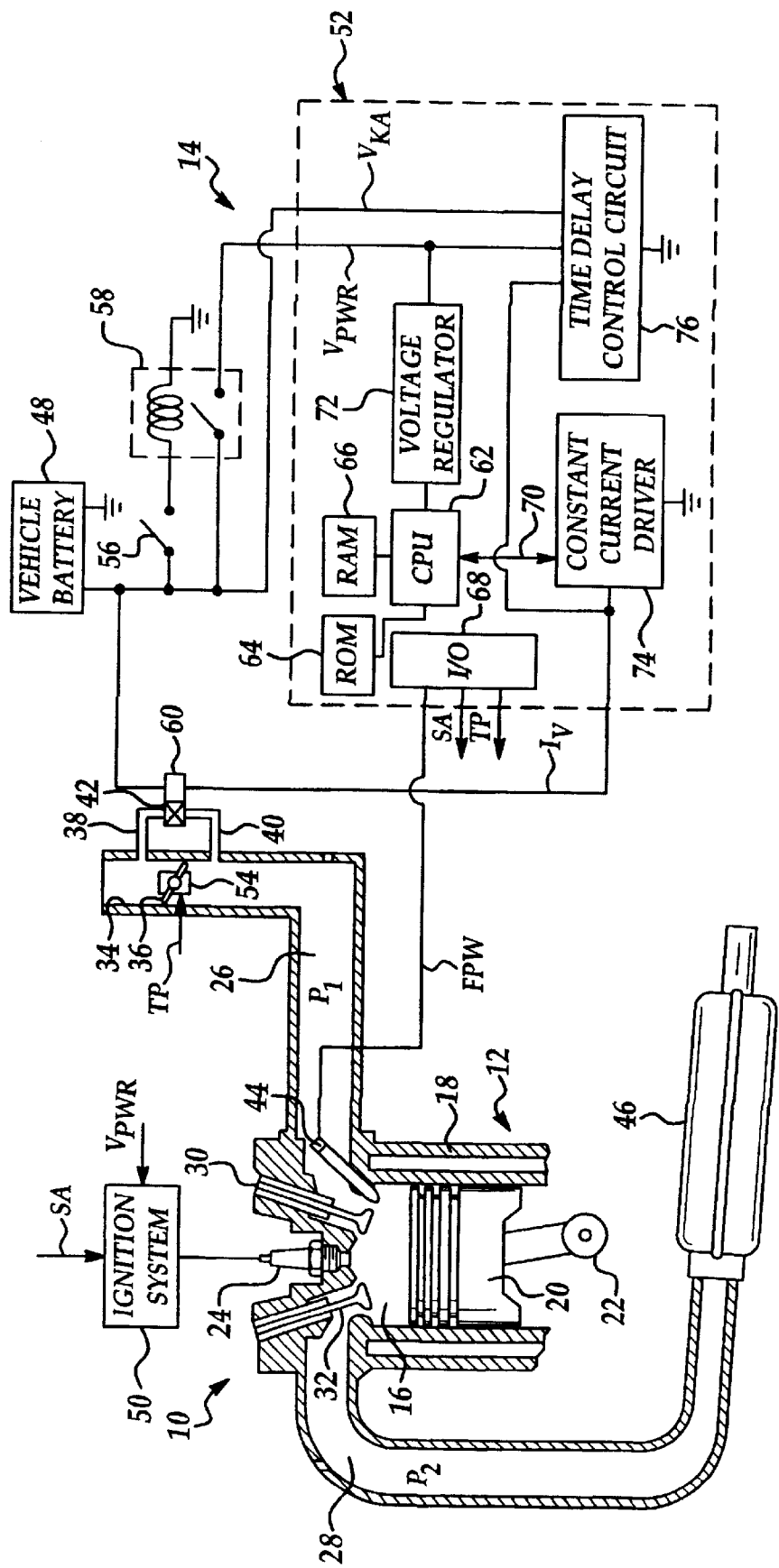
FIG. 1 is a schematic of a vehicle having a conventional engine and a control system in accordance with the present invention.

Referring now to the drawings, like reference numerals are used to identify identical components in the various views. Referring to FIG. 1, an automotive vehicle 10 is shown having a conventional engine 12 and an inventive control system 14 for preventing exhaust gases from entering an intake manifold 26 of engine 12 after engine shutdown.

The engine 12 comprises a plurality of cylinders, one cylinder of which is shown in FIG. 1. Engine 12 further includes a combustion chamber 16, cylinder walls 18, a piston 20, a crankshaft 22, a spark plug 24, an intake manifold 26, an exhaust manifold 28, an intake valve 30, an exhaust valve 32, a throttle body 34, a throttle plate 36, air bypass conduits 38, 40, an idle air control valve 42, a fuel injector 44, a catalytic converter 46, and a battery 48.

Combustion chamber 16 communicates with intake manifold 26 and exhaust manifold 28 via respective intake and exhaust valves 30, 32. Piston 20 is positioned within combustion chamber 16 between cylinder walls 18 and is connected to crankshaft 22. Ignition of an air-fuel mixture within combustion chamber 16 is controlled via spark plug 24 that delivers ignition spark responsive to a signal from distributorless ignition system 50.

Intake manifold 26 communicates with throttle body 34 via throttle plate 36 and includes fuel injector 44 and coupled thereto. The operational position of throttle plate 36 is controlled by actuator 54 responsive to a signal TP received from controller 52. Fuel injector 44 delivers an amount of fuel to combustion chamber 16 proportional to a duty cycle of signal FPW received from controller 52.

Exhaust manifold 28 communicates with catalytic converter 46 which reduces exhaust gases such a hydrocarbons (HC), nitrous oxides (NOx), and carbon monoxide (CO).

Air bypass conduits 38, 40, and idle air valve 42 are provided to supply air at ambient atmospheric pressure or greater to intake manifold 26. As will be discussed in greater detail below, valve 42 will be utilized after engine shutdown to allow airflow into intake manifold 26. As shown, when valve 42 is open, conduits 38, 40 allow air from throttle body 34 to bypass throttle plate 36 and enter intake manifold 26. Alternately, when valve 42 is closed, no airflow passes through conduits 38, 40 to manifold 26.

Battery 48 provides an. operational voltage $V_{PWR}$ to control system 14. Battery 48 is conventional in the art and may comprise a 12 Vdc or a 42 Vdc battery.

Control system 14 is provided to control engine 12, and in particular, to control idle air control valve 42 after engine shutdown. Control system 14 includes a controller 52, an ignition switch 56, a relay 58, a valve actuator 60, and ignition system 50.

Controller 52 is provided to control the idle air control valve 42 in accordance with the present invention. Controller 52 includes a microprocessor 62, a read-only memory (ROM) 64, a random access memory (RAM) 66, an I/O interface 68, a communication bus 70, a voltage regulator 72, a constant current driver 74, and a time delay control circuit 76. As illustrated, microprocessor 62 communicates with various computer-readable storage media including ROM 64 and RAM 66. Further, microprocessor 62 communicates with various sensors and actuators (discussed below) via I/O interface 68. Communication bus 70 is provided to allow microprocessor 62 to communicate with constant current driver 74.

When ignition switch 56 is closed by an operator to start engine 12, the controller relay 58 is closed which provides a voltage $V_{PWR}$ to voltage regulator 72 and time delay control circuit 76. The voltage regulator 72 converts the voltage $V_{PWR}$ to a desired operating voltage for microprocessor 62. Microprocessor 62 then generates ignition signals SA, fuel injection signals FPW, throttle position signals TP, utilizing a software program stored in ROM 64, to commence combustion of an air-fuel mixture in the engine cylinders, as known to those skilled in the art.

During engine idle conditions, controller 52 further controls the position of idle air control valve 42 to adjust the amount of air flow provided to the intake manifold 26. In particular, controller 52 controls the position of valve 42 by adjusting a level of current $I_V$ provided to valve actuator 60. In particular, microprocessor 62 sends a serial message via bus 70 to driver 74 indicative of a desired duty cycle for current $I_V$. In response to the serial message, the driver 74 adjusts the duty cycle of current $I_V$ to a desired value which causes actuator 60 to move valve 42 to a desired open position.

When the operator opens ignition switch 56 to shutdown engine 12, the microprocessor 62 stops sending desired duty cycle messages to constant current driver 74. In response, driver 74, stops adjusting the duty cycle of current $I_V$ and the position of valve 42.

In conventional systems (not shown), valve 42 is closed immediately upon engine shutdown when $V_{PWR}$ is no longer supplied to controller 52. However, a disadvantage of convention systems is that a relatively low air pressure in intake manifold 26 results in exhaust gases migrating from the exhaust manifold 28 to manifold 26. As explained above, exhaust gases in intake manifold 26 results in undesirable long engine crank conditions when engine 12 is subsequently started.

To overcome the foregoing problem, controller 52 utilizes a time delay control circuit 76 to control idle air control valve 42 after engine shutdown. In particular, circuit 76 maintains valve 42 open for a predetermined time interval after engine shutdown, to allow air at a relatively high ambient atmospheric pressure to enter intake manifold 26. Because the pressure $P_1$ in intake manifold 26 is higher than the pressure $P_2$ in exhaust manifold 28, exhaust gases are prevented from migrating to intake manifold 26. Further, when intake and exhaust vales 30, 32 are overlapped in an open position, the pressures $P_2$ and $P_2$ may eventually equalize, however, the exhaust gases will tend to remain in the exhaust manifold 28.

Figure 2:
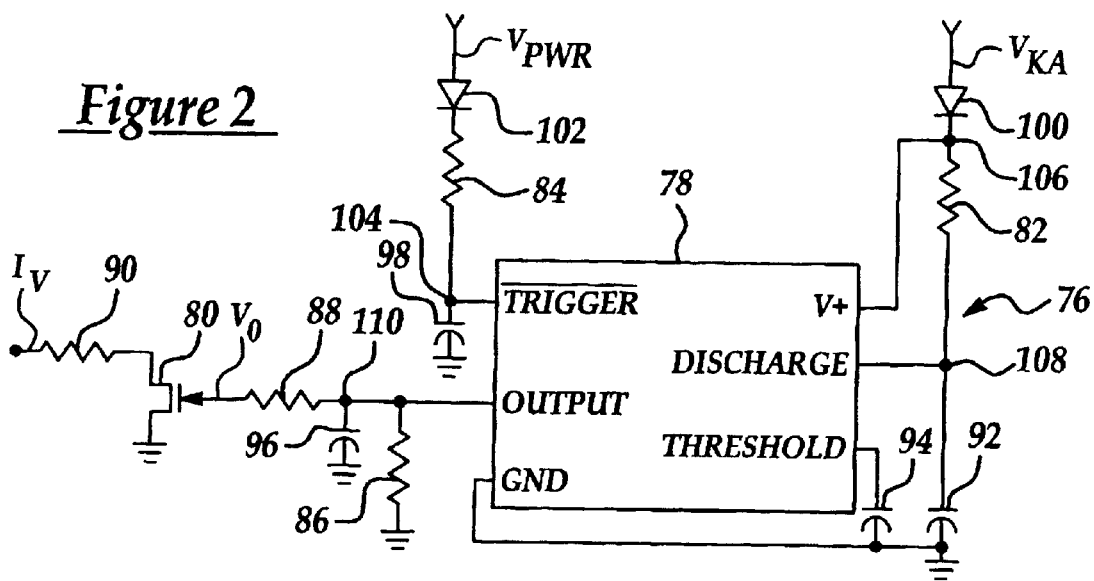
FIG. 2 is a schematic of a time delay control circuit for controlling an idle air control valve after engine shutdown.
Figure 3A:
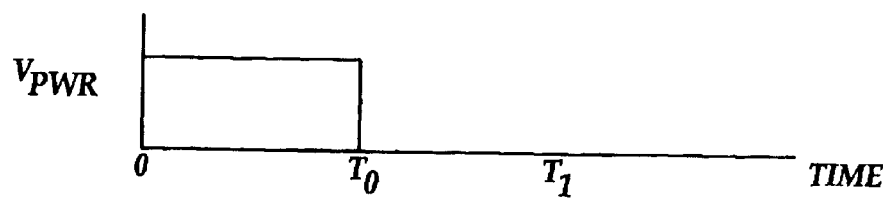
FIGS. 3A–3C are schematics of signals generated by the control system shown in FIG. 1.
Figure 3B:
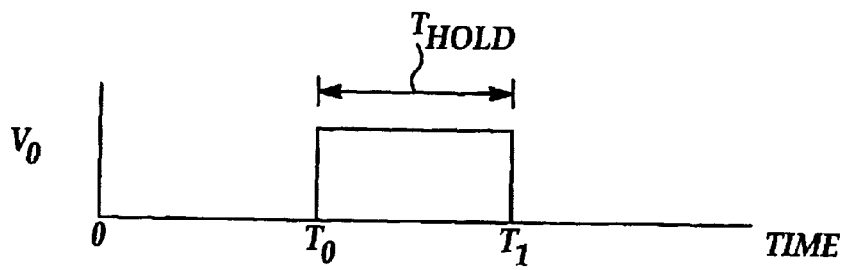
Figure 3C:
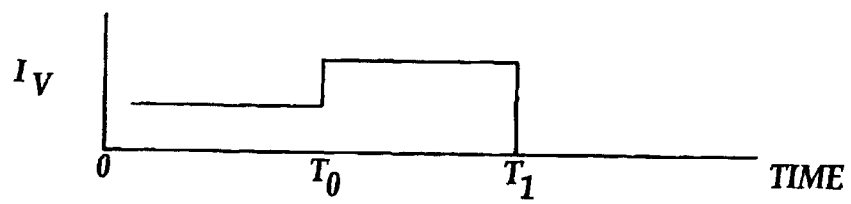

Referring to FIG. 2, time delay control circuit 76 is illustrated. Circuit 76 includes a timer chip 78, a transistor 80, resistors 82, 84, 86, 88, 90, capacitors 92, 94, 96, 98, and diodes 100, 102.

The timer chip 78 is provided to generate output signal $V_O$. The chip 78 is conventional in the art and may comprise a LMC555 CMOS timer manufactured by National Semiconductor. Those skilled in the art will recognize that various chips and/or circuits could be used instead of the LMC555 CMOS timer.

As illustrated, timer chip 78 includes a TRIGGER pin, an OUTPUT pin, a GND pin, a V+pin, a DISCHARGE pin, and a THRESHOLD pin. The TRIGGER pin is connected to a node 104. The node 104 is connected to a series combination of diode 102 and resistor 84 and is further connected to capacitor 98. The TRIGGER pin is used by chip 78 to determine when the voltage $V_{PWR}$ transitions to a low logic level (indicative of engine shutdown). The V+pin is connected to node 106 which receives keep-alive voltage $V_{KA}$ (from battery 48) through a diode 100. Node 106 is further connected through a series combination of resistor 82 and capacitor 92 to ground. The values of resistor 92 and capacitor 94 determine a timing interval $T_{HOLD}$ for maintaining an output voltage $V_O$ at a high logic level. The DISCHARGE pin is connected to node 108 disposed between resistor 82 and capacitor 92. The THRESHOLD pin is connected to ground via capacitor 94. The GND pin is directly connected to ground. The OUTPUT pin is connected to a node 110 which is further connected to a parallel combination of capacitor 96 and resistor 86 to ground. Resistor 88 is connected between a gate of FET transistor 80 and node 110 to limit the control voltage $V_O$ to a desired maximum voltage. The transistor 80 is provided to control the current $I_V$ to maintain the idle air control valve 42 in an open position for a predetermined time interval $T_{HOLD}$ after engine shutdown. As illustrated, the source of transistor 80 is connected to resistor 90 and the drain of transistor 80 is connected to ground.

Referring to FIGS. 2, 3A, 3B, 3C, the operation of time delay control circuit 76 will be explained. At time $T_O$, the operator closes ignition switch 56 to shutdown engine 12 and the voltage $V_{PWR}$ switches to the low logic level. In response, timer chip 78 senses the transition of voltage $V_{PWR}$ to a low logic level and switches an output voltage $V_O$ to a high logic level. The output voltage $V_O$ turns on transistor 80 which causes current $I_V$ to be maintained at a predetermined current level. The current $I_V$ induces actuator 60 to adjust and/or maintain idle air control valve 42 at a predetermined open position to allow air at ambient atmospheric pressure to communicate with intake manifold 26. After a predetermined time interval $T_{HOLD}$ has elapsed (at time $T_1$), the timer chip 78 switches the output voltage $V_O$ to a low logic level which turns the transistor 80 off and causes current $I_V$ to fall to zero current. The time interval $T_{HOLD}$ may be set to a time interval between 1–3 seconds. In response, the de-energized actuator 60 closes valve 42 to prevent any further airflow into intake manifold 26.

Those skilled in the art, however, will recognize that a plurality of alternate circuits could be utilized instead of circuit 76. In particular, circuit 76 may comprise any circuit or controller capable of maintaining idle air control valve 42 (or throttle plate 36) open for a predetermined time interval after engine shutdown. For example, microprocessor 62 could be utilized to actuate either throttle plate 36 or idle air control valve 42 to an open position for a predetermined amount of time after engine shutdown, instead of utilizing circuit 76. To implement the alternate embodiment, a capacitor (not shown) could be connected between relay 58 and voltage regulator 72 to supply an operational voltage to microprocessor 62 for a predetermined amount of time after engine shutdown.

The control system 14 and the method for controlling engine 12 in accordance with the present invention provide a substantial advantage over conventional systems and methods. As discussed above, the control system 14 increases the pressure in the intake manifold 26 to ambient atmospheric pressure after shutdown. As a result, exhaust gases remain substantially within the exhaust manifold 28 even when the intake and exhaust valves 30, 32 overlap in an open position after engine shutdown. Thus, upon engine startup, the intake manifold 26 is relatively free of exhaust gases and contains sufficient air to allow relatively quick combustion of an air-fuel mixture in the engine cylinder, without a relatively long engine crank.

What is claimed is:

1. A method for controlling an engine after engine shutdown, said engine having a valve controlling air flow into an intake manifold of said engine, said method comprising:

generating a fuel delivery signal related to a desired engine output, said fuel delivery signal being generated by a controller;

injecting fuel in response to said fuel delivery signal;

shutting down said engine to thereby disable said fuel delivery signal; and, opening said valve to increase a pressure level in said intake manifold toward an ambient atmospheric pressure level after said fuel delivery signal is disabled.

2. The method of claim 1 further including closing said valve after a predetermined amount of time has elapsed from said opening of said valve.

3. The method of claim 1 wherein said engine shutdown occurs when an ignition switch is switched to an open position.

4. The method of claim 1 wherein said step of opening said valve includes generating an electrical control signal to maintain said valve in an open position.

5. A control system for controlling an engine after engine shutdown, said engine having a valve controlling air flow into said intake manifold, said control system having:

a fuel injector injecting fuel responsive to a fuel delivery signal;

a valve actuator configured to control an operational position of said valve responsive to a control signal; and, a controller configured to generate said fuel delivery signal to induce said fuel injector to inject said fuel, said controller further configured to shutdown said engine to thereby disable said fuel delivery signal, said controller further configured to generate said control signal to induce said actuator to open said valve to increase a pressure level in said intake manifold toward an ambient atmospheric pressure level.

6. The control system of claim 5 wherein said valve is one of a throttle valve and an idle air control valve.

7. The control system of claim 5 wherein said controller is further configured to close said valve after a predetermined amount of time has elapsed from said opening of said valve.

* * * * *